UNITED STATES PATENT OFFICE 2,456,647

ACRYLIC ESTERS OF OLEFINIC ALCOHOLS AND POLYMERS THEREOF AND METHOD FOR MAKING THEM

Chessie E. Rehberg, Glenside, and Charles H. Fisher, Abington, Pa., assignors to the United States of America as represented by the Secretary of Agriculture No Drawing. Application July 15, 1944,
Serial No. 545,164

7 Claims. (Cl. 260—79)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to us of any royalty thereon.

This invention relates to new esters of acrylic acid polymers thereof and methods for preparing them. More particularly it relates to acrylic esters wherein the alcohol radical contains one or more olefinic double bonds, to polymers and copolymers thereof and to methods for preparing them.

The general object of this invention is to provide new and useful compositions of matter comprising acrylic esters of olefinic alcohols and polymers thereof, which possess in variable degree the property of producing cross-linked polymers, polymers which contain olefinic double bonds, or both. Other objects and advantages of the invention will be apparent from the following description.

No general method of commercial value for the preparation of acrylic esters of olefinic alcohols has been known heretofore. Although the alcoholysis method has been used in the preparation of certain esters of acrylic and methacrylic acids, a successful application of the method to the preparation of acrylic esters of olefinic alcohol is not known to the prior art. One difficulty in this connection is that such esters polymerize with great ease and the olefinic alcohols often readily undergo isomerization or molecular rearrangement under the usual conditions for carrying out the alcoholysis.

The acrylic esters of olefinic alcohols are especially desirable because of their valuable and unusual property of producing polymers and copolymers which contain olefinic double bonds, and hence are capable of reacting with halogens, sulfur, and other reagents which normally react with such double bonds. Furthermore, the polymers of these acrylic esters may have a variable and controllable degree or amount of cross-linkage, depending on the particular ester used, the amount used, and the conditions under which it is polymerized. This is a valuable property, since a small amount of cross-linkage produces drastic changes in the nature and physical properties of the polymer, reducing its solubility, increasing its hardness, and increasing its heat resistance.

It has been found that acrylic esters of olefinic alcohols can be prepared satisfactorily and in good yield, using the alcoholysis method, by the reaction of methyl or ethyl acrylate or substituted acrylate with the olefinic alcohol, provided that suitable precautions are taken to prevent polymerization.

In the preparation of acrylic esters of olefinic alcohols by the alcoholysis method, a lower acrylic ester, such as the methyl or ethyl ester, is heated with the olefinic alcohol in the presence of a suitable catalyst and a polymerization inhibitor. Aluminum alcoholate is a preferred catalyst although alkali metal alcoholates may be used and, in cases where the olefinic alcohol is not adversely affected, mineral acids, sulfonic acids and other acidic catalysts may be used.

Certain olefinic alcohols undergo rearrangement or isomerization in the presence of strong acids under the conditions of the alcoholysis reaction. The alcohol, such as methanol or ethanol, which is liberated in the alcoholysis reaction, can often be removed from the reaction mixture by distillation during the reaction, thus causing the reaction to proceed nearer completion. For this purpose, when using methyl acrylate or methacrylate as a reagent, it is convenient to distill out the azeotrope which methanol forms with methyl acrylate or methacrylate. Obviously, when this method is to be used, an excess of the methyl acrylate or methacrylate should be put into the reaction mixture. The alcohol liberated in the reaction may also be removed from the reaction mixture during the course of the reaction by putting in a suitable entraining agent such as a paraffinic hydrocarbon liquid of suitable boiling range. For removing methanol from a mixture containing methyl acrylate, a suitable hydrocarbon is a petroleum ether fraction boiling between 50–65° C. Other fractions would be suitable for separating other mixtures.

The following examples illustrate but are not limitations upon this invention:

EXAMPLE I

*Allyl acrylate, $CH_2\!:\!CHCOOCH_2CH\!:\!CH_2$*

Three moles (258 g.) of methyl acrylate, 2.0 moles (116 g.) of allyl alcohol, 10 g. of hydroquinone and 2 g. of p-toluene-sulfonic acid were refluxed together in a flask attached to a 3-ft. fractionating column. The still was operated under total reflux until the temperature at the stillhead dropped to 62-3° C., the boiling-point of the methanol-methyl acrylate azeotrope. The azeotrope was then slowly distilled off as rapdily as formed until no more methanol was produced. The excess methyl acrylate was then distilled off and finally the allyl acrylate was distilled at 120-25° C. Upon redistillation the acrylate boiled at 122° C. (47° C. at 40 mm.). At 20° C. it had $N_D^{20}$, 1.4320;

$$d_4^{20}, .9441$$

The yield was 156 g., or 70 percent of the theoretical amount.

Polymerized alone by heat, peroxide or ultraviolet light, allyl acrylate gives a very hard, brittle, insoluble and infusible cross-linked resin. When a few tenths of one percent of allyl acrylate in methyl acrylate is polymerized the copolymer is harder, stronger, tougher and more resistant to solvents and heat than is polymethyl acrylate.

EXAMPLE II

Methallyl acrylate, $CH_2:CHCOOCH_2C(CH_3):CH_2$

One gram of aluminum foil was dipped into mercury and then dissolved in hot methallyl alcohol. Enough methallyl alcohol to make a total of 144 g. (two moles) was then added. Six moles (516 g.) of methyl acrylate and 15 g. of phenyl-beta-naphthylamine were then added and the mixture was refluxed with continuous removal of methanol-methyl acrylate azeotrope as described in Example I.

The methallyl acrylate was distilled at 57° C. at 28 mm., the reduced pressure being preferred because of the lesser danger of polymerization of the product. The methallyl acrylate had $N_D^{20}$, 1.4385 and $$d_4^{20}, 0.9275$$

The yield was 74 percent of the theoretical.

Polymers and copolymers of methallyl acrylate were prepared as described for allyl acrylate in Example I, and the properties of the resins were similar to those obtained from the allyl ester, though the tendency to produce cross-linkage appeared to be slightly less.

EXAMPLE III

Crotyl acrylate, $CH_2:CHCOOCH_2CH:CHCH_3$

Two moles (144 g.) of crotyl alcohol, 6.0 moles (516 g.) of methyl acrylate, 10 g. of p-phenylene diamine and 5 g. of aluminum tert.-butoxide were refluxed as described in the previous examples. When the reaction was complete the mixture was distilled, the crotyl acrylate boiling at 60° C. at 23 mm. It had $N_D^{20}$, 1.4422 and $$d_4^{20}, 0.9344$$

The yield was 69 percent of the theoretical.

Polymers and copolymers were prepared as described in Example I. Crotyl acrylate alone produces a cross-link resin but its copolymers with monofunctional monomers show less cross-linkage than do the copolymers of allyl acrylate.

EXAMPLE IV

Citronellyl acrylate,
$CH_2:CHCOOCH_2CH_2CH(CH_3)(CH_2)_3C(CH_3):CH_2$

One mole (156 g.) of citronellol, 4.0 moles (344 g. of methyl acrylate, 15 g. of phenyl-beta-naphthylamine and 5 g. of aluminum tert.-butoxide were refluxed as described in Example I. When the reaction was complete and the products were distilled, the citronellyl acrylate was obtained as a liquid which boiled at 108° C. at 5.4 mm. and had $N_D^{20}$, 1.4500 and $$d_4^{20}, 0.8879$$

The yield was 91 percent of the theoretical.

EXAMPLE V

Geranyl acrylate,
$CH_2:CHCOOCH_2CH:C(CH_3)(CH_2)_2CH:C(CH_3)_2$

One mole (154 g.) of geranyl alcohol, 4.0 moles (344 g.) of methyl acrylate, 10 g. of phenyl-beta-naphthylamine and a solution of 1 g. of amalgamated aluminum foil in 20 cc. of methanol were mixed and caused to react as described in Example I.

Geranyl acrylate was obtained as a colorless, mobile liquid boiling at 112° C. at 4.7 mm. and having $N_D^{20}$, 1.4718 and $$d_4^{20}, 0.9144$$

The yield was 74 percent.

EXAMPLE VI

Oleyl acrylate,
$CH_2:CHCOOCH_2(CH_2)_7CH:CH(CH_2)_7CH_3$

A mixture of unsaturated alcohols obtained by the partial hydrogenation of a commercial fish oil was fractionally distilled and the fraction boiling at 185-95° C. at 5 mm. was used to prepare the acrylate. This fraction had a refractive index at 20° C. of 1.4635 and was a colorless, oily liquid. From 92 g. of the crude oleyl alcohol described above, 258 g. of methyl acrylate, 10 g. of hydroquinone and 1 cc. of sulfuric acid the methanol-methyl acrylate azeotrope was distilled as described in Example I. When the reaction was complete the excess methyl acrylate was distilled out. The residue was then washed with aqueous sodium carbonate solution to remove the sulfuric acid, then washed with water, dried by warming under vacuum, and finally distilled from a low-necked distilling flask under 0.4 mm. pressure. The distillate was then redistilled through a fractionating column, the acrylate boiling at 150-56° C. at 0.2 mm. and having $N_D^{20}$, 1.466 and $$d_4^{20}, 0.882$$

EXAMPLE VII

Cinnamyl acrylate, $CH_2:CHCOOCH_2CH:CHC_6H_5$

One mole (134 g.) of cinnamyl alcohol, 4.0 moles (344 g.) of methyl acrylate, 15 g. of phenyl-beta-naphthylamine and 5 g. of aluminum tert.-butoxide were mixed and allowed to react as in Example I. When no more methanol was produced, the mixture was fractionally distilled.

The cinnamyl acrylate was obtained as a pleasant-smelling liquid boiling at 131° at 4 mm. and having $N_D^{25}$, 1.5508 and $$d_4^{25}, 1.0495$$

The yield was 71 percent of the theoretical.

EXAMPLE VIII

Beta-chloroallyl acrylate,
$CH_2:CHCOOCH_2CCl:CH_2$

By proceeding substantially as in Example I there was obtained from beta-chloroallyl alcohol and methyl acrylate, in the presence of sulfuric acid and hydroquinone, a 56 percent yield of beta-chloroallyl acrylate having a boiling point of 74° C. at 29 mm.; $N_D^{20}$, 1.4600;

$$d_4^{20}, 1.1243$$

This acrylate polymerizes very readily, the product being similar in physical appearance to that obtained from allyl acrylate.

EXAMPLE IX

*Gamma-chloroallyl acrylate,*
$CH_2:CHCOOCH_2CH:CHCl$

Two moles (185 g.) of gamma-chloroallyl alcohol (mixture of cis- and transisomers), and 6.0 moles (516 g.) of methyl acrylate, 15 g. of phenyl-beta naphthylamine and 1 g. of aluminum foil (amalgamated and dissolved in the alcohol) were refluxed and caused to react as in Example I. By distilling the reaction mixture, the gamma-chloroallyl acrylate was obtained as a colorless liquid boiling at 87° C. at 34 mm. and having $N_D^{20}$, 1.4680 and $$d_4^{20}, 1.1385$$

The yield was 68 percent of the theoretical.

EXAMPLE X

*Methyl vinyl carbinyl acrylate,*
$CH_2:CHCOOCH(CH_3)CH:CH_2$

Two moles (144 g.) of methyl vinyl carbinol, 6.0 moles (516 g.) of methyl acrylate, 10 g. of p-phenylenediamine and 5 g. of aluminum tert.-butoxide were mixed and refluxed as in Example I. When no more methanol was produced the mixture was fractionally distilled. The acrylate boiled at 71° C. at 97 mm. and had $N_D^{20}$, 1.4283 and $$d_4^{20}, 0.9120$$

The yield was 37 percent of the theoretical, some of the product being lost through polymerization.

POLYMERIZATION

EXAMPLE XI

Eighty cc. of ethyl acetate, 19 cc. of methyl acrylate, 1 cc. of crotyl acrylate, and 0.05 g. of benzoyl peroxide was heated for 24 hours at 70° C. The entire mass formed a solid gel which was insoluble in the common organic solvents. By evaporating the solvent, the polymer was obtained as a tough, transparent, slightly elastic, insoluble solid.

EXAMPLE XII

The same as Example XI except that 0.1 g. of dodecyl mercaptan was added to the mixture. Instead of a gel, the product was a sirupy, homogeneous solution from which the polymer was obtained by evaporating the ethyl acetate. This polymer was soft, very elastic and rubber-like, transparent, and readily soluble in ethyl acetate, acetone, toluene and other solvents.

Results similar to those of Examples XI and XII may be obtained by using acrylic esters of olefinic alcohols other than crotyl acrylate, as for example, geranyl citronellyl, rhodinyl or cinnamyl acrylate. It will be understood that other polymerization catalysts, regulators, solvents, etc., may be used and that the polymerization may be carried out in solution, in aqueous emulsion or in mass.

From the examples described above it is apparent that a wide variety of acrylic esters of olefinic alcohols can be prepared by the process of this invention. In addition to the esters of acrylic acid, the corresponding esters of substituted acrylic acids such as methacrylic, ethacrylic, propacrylic, chloroacrylic and bromoacrylic acid may be prepared by the alcoholysis method. Among other olefinic alcohols that may be used are penten-4-ol-1 and undecenyl alcohol.

The acrylic esters of olefinic alcohols are especially valuable in the production of resins and plastics because in addition to polymerizing alone they readily copolymerize with other polymerizable compounds containing the $CH_2=C=$ grouping to produce polymers of quite different physical and chemical properties than is obtained by polymerization of the latter compounds alone. Thus, a very small percentage of the acrylate of an olefinic alcohol, when copolymerized with a monomer such as methyl acrylate or other alkyl acrylate or methacrylate, produces a cross-linked polymer which is harder, tougher and more resistant to solvents and heat than is that obtained without the use of the acrylate of an olefinic alcohol.

The degree or extent of the changes in the properties of the polymer can be controlled within wide limits, not only by varying the amount of the olefinic acrylic ester but also by suitable choice of the latter ester. Thus, 1 percent of allyl acrylate in methyl acrylate ordinarily produces a hard, tough, insoluble cross-linked resin whereas 1 percent of oleyl or citronellyl acrylate does not produce appreciable evidence of cross-linkage in methyl acrylate. Thus, the visible effects of cross-linkage are lessened as the distance between the two double bonds in the alkenyl acrylate is increased. The rigidity of the three-dimensional molecule is lessened when the length of the cross-linking chains is increased.

Another important advantage in using acrylic esters of olefinic alcohols in the production of polymers and copolymers lies in the fact that by proper choice of acrylic ester and conditions for polymerization it is possible to obtain linear or only slightly cross-linked polymers which still contain olefinic double bonds. Several substances, such as carbon tetrachloride, mercaptans, etc., are known to the art which tend to prevent the formation of cross-linked resins during the polymerization. Also, variation of catalyst, temperature and other factors have a known effect on the type of polymer produced.

The unsaturated polymers which be made by this process will react with the reagents which normally react with such unsaturated materials such as halogens and sulfur. Halogenation of the polymers increase their flame resistance while reaction with sulfur produces the effects which have long been associated with the process of vulcanization.

Copolymers of alkyl acrylates and small amounts of the alkenyl acrylates described herein are often soft, elastic, and rubberlike and can be vulcanized with sulfur and rubber accelerators to produce rubberlike products. For this purpose we prefer the acrylic esters of olefinic alcohols of four or more carbon atom content. Thus crotyl, citronellyl, cinnamyl, oleyl and similar acrylates may be copolymerized with methyl, ethyl, or butyl acrylate, butyl, amyl, 2-ethylhexyl or lauryl meth-acrylate or similar monomers which give polymers of the desired consistency. The copolymer may be vulcanized, milled and molded, using the apparatus and reagents which are known to the rubber industry.

The expression "lower alkyl" is employed herein in its commonly understood and accepted sense, as found in numerous patents, meaning alkyl groups such as methyl, ethyl, etc., but excluding alkyl groups having more than six carbon atoms.

Having thus described our invention, we claim:

1. The process of preparing an unsaturated resin which comprises copolymerizing an alkenyl acrylate of the formula $CH_2=CHCOOR'$, in which R' is a radical having at least one olefinic double bond and at least four carbon atoms in its open olefinic chain, with a lower alkyl ester of acrylic acid, in the presence of a polymerization regulator taken from the group consisting of mercaptans and carbon tetrachloride, the alkenyl acrylate being present in the proportion of one to five percent of the mixture of lower alkyl acrylate and alkenyl acrylate.

2. The process of claim 1 in which the regulator is dodecyl mercaptan.

3. The process of claim 1 in which the lower alkyl acrylate is methyl acrylate and the regulator is dodecyl mercaptan.

4. A resin comprising a copolymer the polymerizable constitutents of which consist of a lower alkyl ester of acrylic acid and one to five percent of geranyl ester of acrylic acid.

5. A resin comprising a copolymer the polymerizable constituents of which consist of a lower alkyl ester of acrylic acid and one to five percent of oleyl ester of acrylic acid.

6. A resin comprising a copolymer the polymerizable constituents of which consist of a lower alkyl ester of acrylic acid and one to five percent of citronellyl ester of acrylic acid.

7. The unsaturated resin comprising a copolymer the polymerizable constituents of which consist of a lower alkyl ester of acrylic acid and one to five percent of an alkenyl acrylate of the formula $CH_2=CHCOOR'$ in which R' is a radical having at least one olefinic double bond and at least four carbon atoms in its open olefinic chain, a polymerization regulator taken from the group consisting of mercaptans and carbon tetrachloride being present in the copolymerization preparation thereof.

CHESSIE E. REHBERG.
CHARLES H. FISHER.

REFERENCES CITED

The following references are of record in the file of this patent:

UNITED STATES PATENTS

| Number | Name | Date |
|---|---|---|
| 2,129,665 | Barrett et al. | Sept. 13, 1938 |
| 2,187,694 | Slagh | Jan. 16, 1940 |
| 2,189,735 | Kistler et al. | Feb. 6, 1940 |
| 2,278,637 | Barnes | Apr. 7, 1942 |
| 2,279,293 | Clifford | Apr. 14, 1942 |
| 2,332,461 | Muskat et al. | Oct. 19, 1943 |
| 2,332,896 | D'Alelio | Oct. 26, 1943 |
| 2,363,044 | Clifford | Nov. 21, 1944 |